(12) United States Patent
Okuyama

(10) Patent No.: US 7,385,490 B2
(45) Date of Patent: Jun. 10, 2008

(54) METHOD FOR SETTING SCREENS OF INBOARD INDICATORS

(75) Inventor: Takashi Okuyama, Shizuoka-ken (JP)

(73) Assignee: Yamaha Marine Kabushiki Kaisha, Shizuoka-ken (JP)

( * ) Notice: Subject to any disclaimer, the term of this patent is extended or adjusted under 35 U.S.C. 154(b) by 202 days.

(21) Appl. No.: 11/211,854

(22) Filed: Aug. 24, 2005

(65) Prior Publication Data

US 2006/0055563 A1 Mar. 16, 2006

(30) Foreign Application Priority Data

Aug. 24, 2004 (JP) ............................. 2004-243073

(51) Int. Cl.
*B60Q 1/00* (2006.01)
*G08B 25/00* (2006.01)
*G09G 5/00* (2006.01)

(52) U.S. Cl. ............ 340/438; 340/461; 340/462; 340/525; 340/984; 440/2; 715/700; 715/716; 715/735; 701/36; 345/156; 345/902

(58) Field of Classification Search ............... 340/438
See application file for complete search history.

(56) References Cited

U.S. PATENT DOCUMENTS

| | | | |
|---|---|---|---|
| 6,185,491 B1 * | 2/2001 | Gray et al. ................. | 701/36 |
| 6,785,595 B2 * | 8/2004 | Kominami et al. .......... | 701/36 |
| 6,789,007 B2 * | 9/2004 | Ellis et al. .................. | 701/33 |
| 6,872,106 B2 | 3/2005 | Kanno | |
| 7,146,260 B2 * | 12/2006 | Preston et al. .............. | 701/24 |
| 2005/0222726 A1 * | 10/2005 | Furui et al. ................. | 701/36 |

* cited by examiner

*Primary Examiner*—Donnie L. Crosland
(74) *Attorney, Agent, or Firm*—Knobbe, Martens, Olson & Bear, LLP

(57) ABSTRACT

A method for setting screens of plural inboard indicators connected to an inboard network via a communication line includes connecting a terminal to the inboard network. The method also includes loading the terminal with data from the plural indicators and setting the screens of the indicators in the terminal. Additionally, the method includes sending screen setting data from the terminal to the respective indicators via the communication line after setting the screens of the indicators.

12 Claims, 5 Drawing Sheets

(A)

(B)

| Item | Selection | | |
|---|---|---|---|
| Engine speed | 100rpm | 1rpm | |
| Sub-screen | None | Bar | Numerals |

(C)

METHOD FOR SETTING SCREENS OF
INBOARD INDICATORS

RELATED APPLICATION

The present application is based upon and claims priority under § 119 (a-d) to Japanese Patent Application No. 2004-243073, filed Aug. 24, 2004, the entire contents of which is hereby incorporated by reference.

BACKGROUND OF THE INVENTION

1. Field of the Invention

The present invention relates to a method for setting screens of inboard indicators connected to an inboard network of a vehicle, and in particular relates to setting screens of inboard indicators for boats.

2. Description of the Related Art

For use with boats provided with multiple propulsion units, such as outboard motors or stern drives, inboard network systems have been used to control each propulsion unit from an inboard space via a network. The network system includes a communication network, such as a LAN, to link together the inboard space and the propulsion units and to send control signals to each propulsion unit.

Japanese Patent Publication No. JP-A-2003-127985 describes an outboard motor status display device, an inboard network system, etc., which can easily perform controls and other functions for multiple outboard motors connected to an inboard network according to the installation positions of the outboard motors. The display device and inboard network system include an engine position identification mechanism for identifying an engine whose status is displayed on an indicator for engine speed, oil level, and other engine status. The device and the system relate engine status information displayed on the indicator with the position of the engine to control each engine depending on its status.

Japanese Patent Publication No. JP-A-2003-127985 also describes the relation between the indicators and the engine positions, but not a customization method for initially setting display screens according to a customer' request. For example, a user cannot tailor the system to display data digitally or graphically.

To customize a boat with multiple driver's seats, each provided with respective indicators, it is necessary to clearly recognize which indicator of which driver's seat is being set. If it is possible to recognize what the actual appearance of the display screen will be during the setup process, the screen can be easily set without undue complications or effort. Additionally, if the same initial setting is to be made to multiple indicators, it is desirable to customize them efficiently by utilizing the same setting data.

When multiple indicators provided in a boat are to be customized, screen settings can be made individually at respective screens. However, it is troublesome and inefficient to individually set the indicator screens at separate locations in the boat.

SUMMARY OF THE INVENTION

In consideration of the conventional arts discussed above, an aspect of the present invention is to provide a method for setting screens of plural inboard indicators connected to an inboard network easily and efficiently.

In accordance with one embodiment, a method for setting respective screens of plural inboard indicators connected to an inboard network via a communication line is provided. The method includes connecting a terminal to the inboard network; loading the terminal with data from the plural indicators; setting the screens of the indicators in the terminal; and sending screen setting data from the terminal to the respective indicators via the communication line after setting the screens. This allows the screens of the multiple indicators to be set easily and efficiently.

In accordance with another preferred mode of operation, an inboard indicator being set in the terminal, in accordance with the method above, is caused to blink. It is possible to determine which inboard indicator is being set in the terminal by causing the actual indicator to blink. This allows each indicator to be set properly without failure.

In accordance with an additional preferred mode of operation, a screen of the terminal, in accordance with the method above, displays the screen of the indicators. This allows the screen to be set easily and appropriately without failure. This also allows the screen to be checked after the setting.

In accordance with a further preferred mode of operation, setting data on the respective indicators, in accordance with the method above, is saved in a memory of the terminal. When a customization similar to one made previously is to be made, the screen setting can be made efficiently by reading the previous setting data from the memory of the terminal and using the data.

BRIEF DESCRIPTION OF THE DRAWINGS

These and other features, aspects and advantages of the present invention will now be described in connection with a preferred embodiment of the invention, in reference to the accompanying drawings. The illustrated embodiment, however, is merely an example and is not intended to limit the invention. The drawings include the following 5 figures.

DETAILED DESCRIPTION OF THE PREFERRED EMBODIMENT

Figure 1:
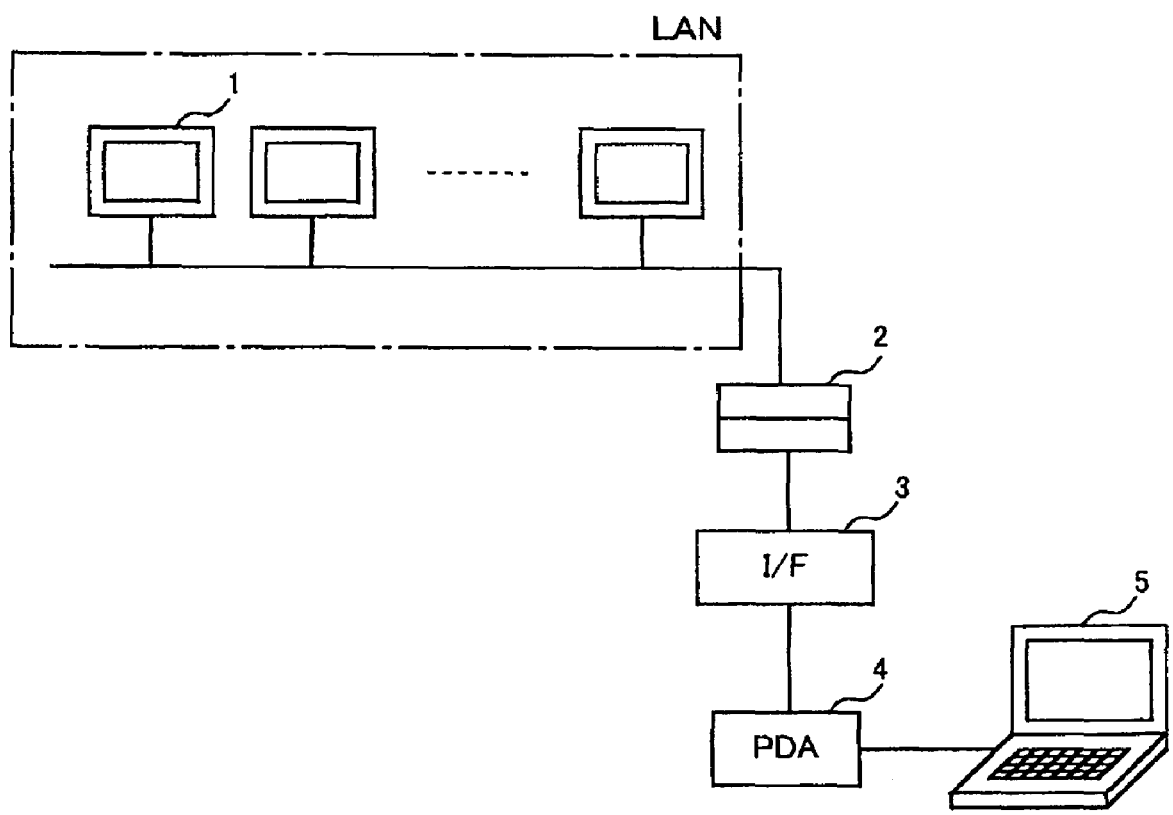
FIG. 1 illustrates the configuration of a preferred embodiment of the present invention.

As shown above in FIG. 1, multiple indicators (gauges) 1 are connected to a LAN (or CAN) communication network. The LAN is connected to an interface 3 via a connector 2. The connector 2 is preferably for connection to an engine (not shown), but is connected to the interface 3, instead, when setting screens of the indicators. A portable terminal 4, such as, for example, but without limitation, a PDA, is connected to the interface 3. In the illustrated embodiment, a PDA 4 is connected to the interface and a personal computer 5 is connected to the PDA 4 to transfer data and executable files. Of course, other types of general purpose computers can be used as an interface to communicate with the indicators 1 via the network. The terminal 4 is preferably operated to set the screens of the indicators 1 following a screen setting program stored in the personal computer 5. In other applications, the screen setting program can be stored in memory of the PDA or in the memory of other devices on the network. Additionally, while the devices on the inboard network preferably are hardwired together, some or all of the communication lines among the devices on the network can be wireless (e.g., employ IR communication).

Figure 2:
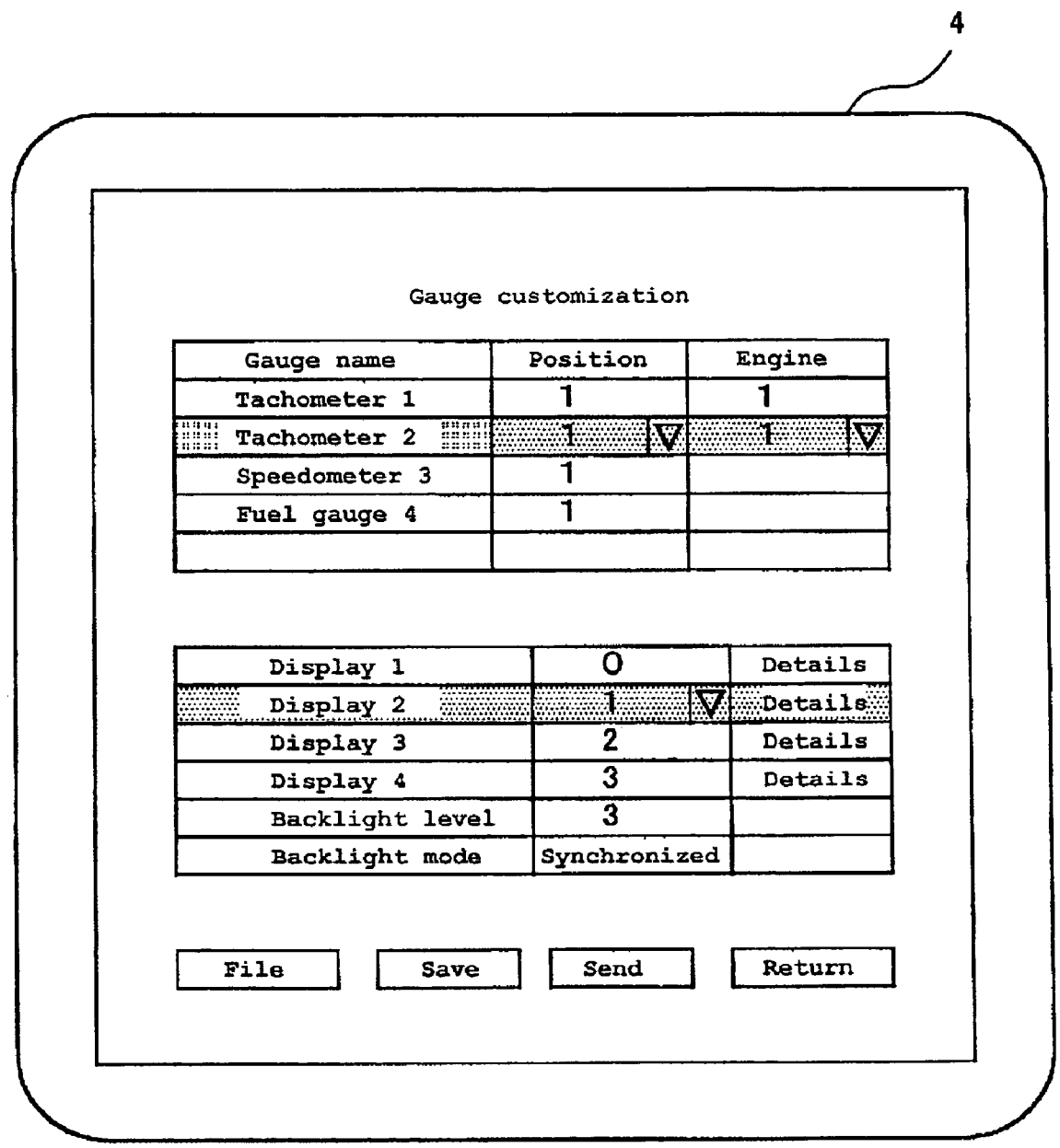
FIG. 2 shows an example of a gauge customization screen of the terminal.

In the illustrated embodiment, as shown in FIG. 2, the "Gauge Name" field of the portable terminal 4 preferably displays the name and the serial number of an indicator. The "Position" field preferably displays the number of a driver's seat where an indicator is installed ("1" or "2" if there are two driver's seats). The "Engine" field displays the number of an associated engine ("1" or "2" for a boat with two engines, and "1", "2" or "3" for a boat with three engines). The noted displayed fields of course are merely exemplary of the type of fields that can be displayed by the screen setting program.

The "Display 1" to "Display 4" fields preferably are for performing four types of screen settings, depending on the driving status, such as cruising, trolling, etc. The screen is set by means of a number for each of the "Display 1" to "Display 4" fields. Clicking the "Details" field displays the setting screen for the indicator. The selected field is highlighted and can be set by scrolling its " " mark.

The "File" button is for reading customization setting data created in the past. The "Save" button is for storing created customization setting data in the terminal 4 (or in the personal computer 5). The "Send" button is for sending the set data to an indicator. The "Return" button is for returning to the selection screen when the setting is completed.

Figure 3:
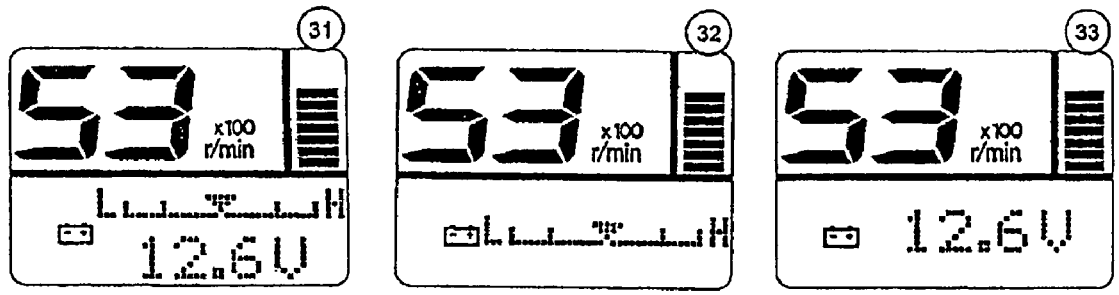
FIG. 3 shows examples of indicator setting screens.
Figure 3:
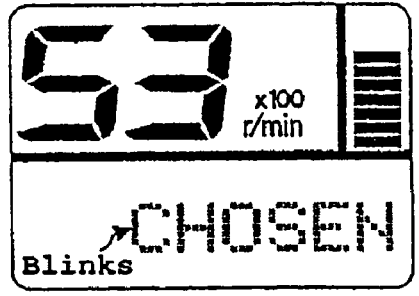

FIG. 3(A) illustrated examples of indicator setting screens (31, 32, 33). An upper area of each screen displays engine speed data, preferably from a tachometer. A sub-screen is provided in a lower area and displays, in the illustrated examples, battery voltage data. The engine speed is displayed in units of 100 rpm or 1 rpm (in units of 100 rpm in all the examples in FIG. 3(A)). The battery voltage can be displayed in a bar graph (32), in numerals (33), or in both a bar graph and numerals (31). The selection screen shown in FIG. 3(B) can be displayed in the terminal to allow each screen display to be set. The setting screen is displayed by clicking the "Details" field for the "Display 1" to "Display 4" fields (See FIG. 2). Among these screens, the number of a screen desired by a customer is selected to be set. When not necessary, the display can be hidden. Of course, the indicators can display other types of information and can be programmed to use other display formats.

The indicator having been selected in FIG. 2 and being set is highlighted in the terminal. The actual inboard indicator preferably simultaneously blinks. At this time, "CHOSEN" is displayed and blinks on the sub-screen, for example, as shown in FIG. 3(C).

Figure 4:
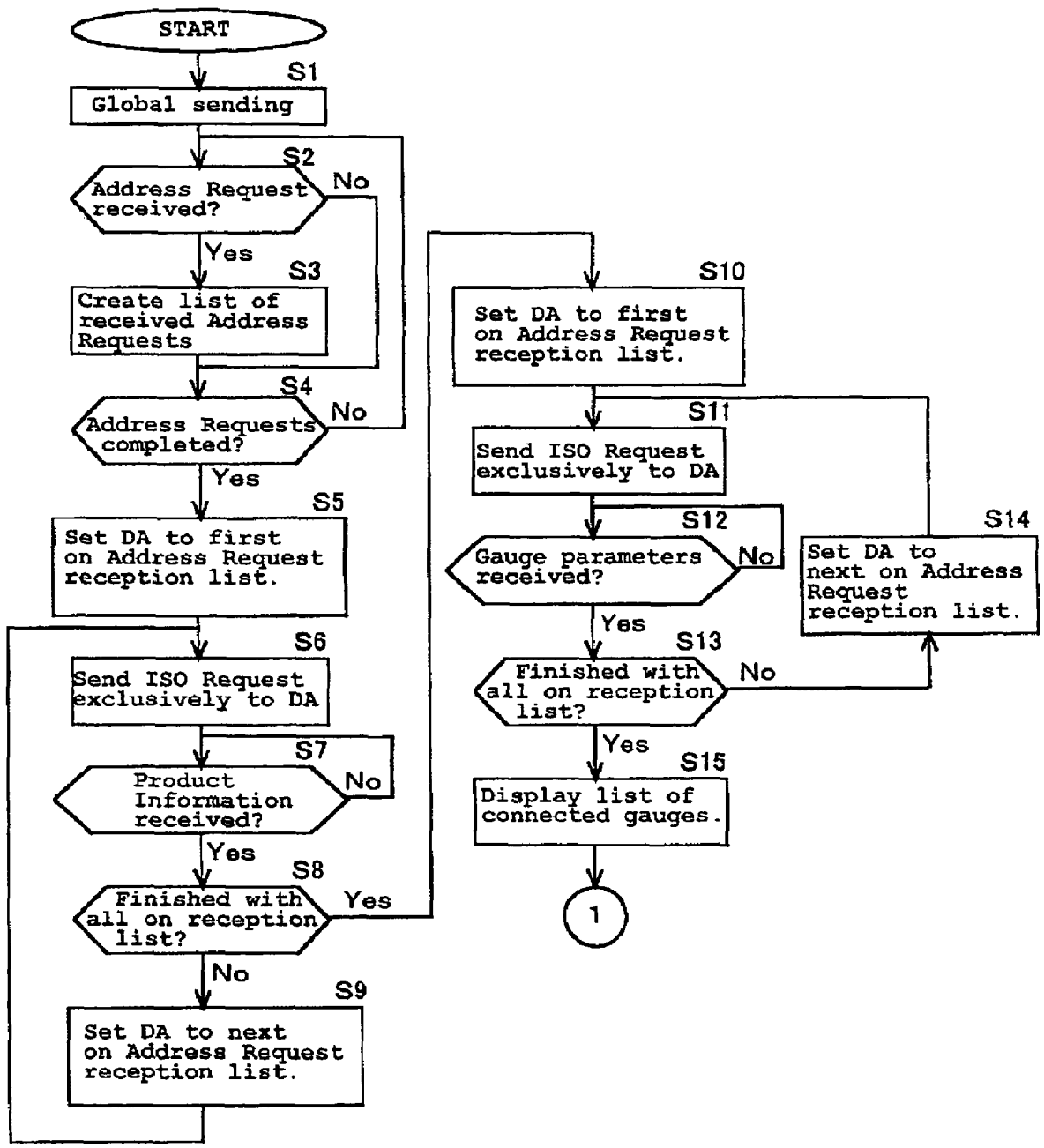
FIGS. 4 and 5 are flowcharts of the method for setting display screens of the present invention.
Figure 5:
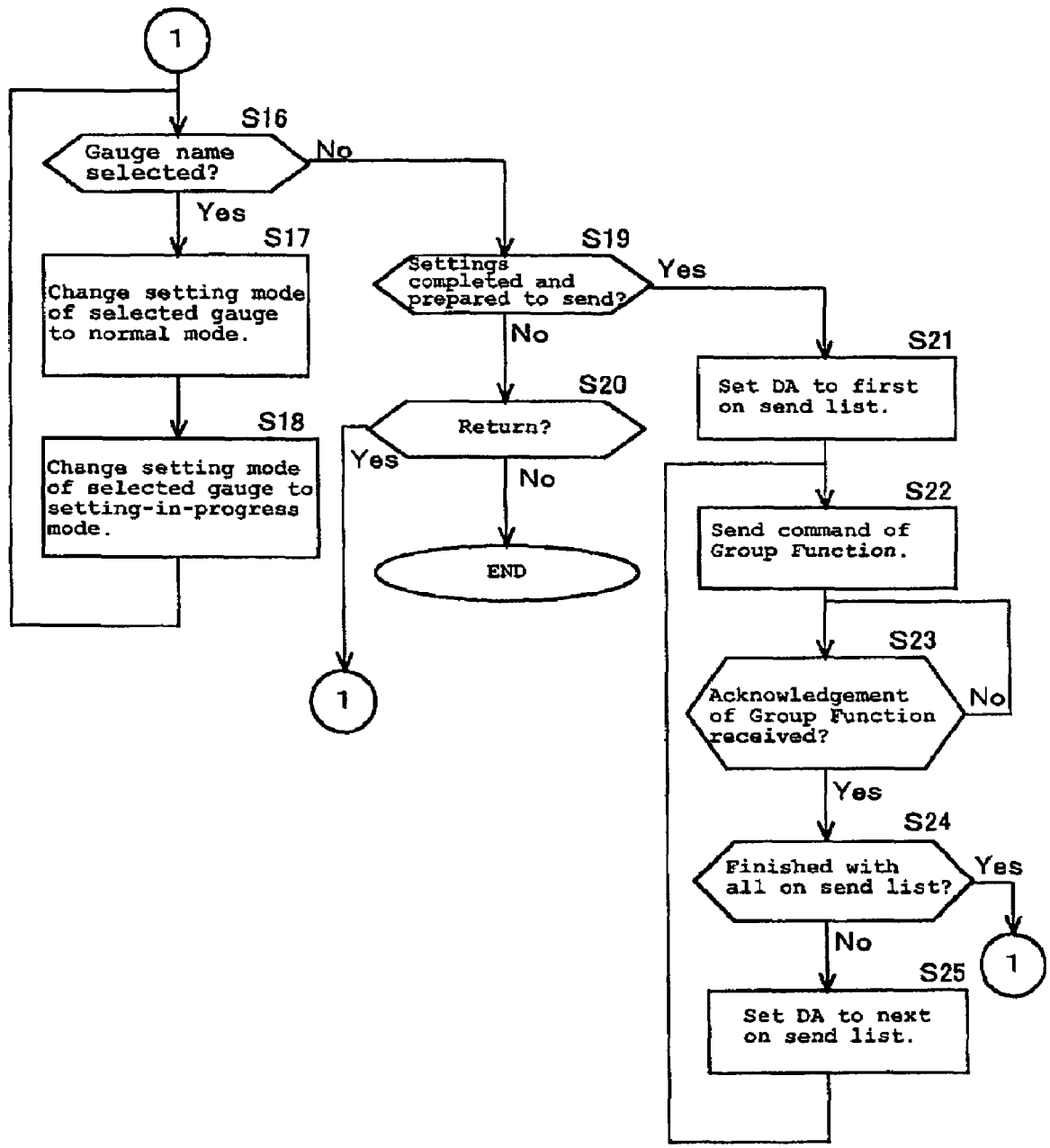

FIGS. 4 and 5 illustrate a method for setting display screen, as described above. Unless indicated otherwise, it may be assumed that the process steps described herein are implemented within software modules (computer programs) that are executed by one or more general purpose computers, and that these steps are performed automatically (i.e., without human intervention). The software modules may be stored on or within any suitable computer storage device. It should be understood that the various steps may alternatively be implemented in-whole or in-part within specially designed hardware.

In one step (S1) of the method, requests are made for indicators connected to the network to send a message named "Address Request", in order to create a list of them.

In Steps S2 and S4 of the method, address requests for an address in the terminal are received from the indicators, and a reception list of all the address requests from the indicators is created.

The destination address is set in Step S5 at a first indicator on the reception list, in order to obtain from the list information necessary to set the screen.

In Steps S6 to S9, information on the indicator (e.g., what type of indicator (tachometer, speedometer, etc.) it is) is received from all the indicators on the reception list The destination address is set (in Step S10) at the first indicator on the reception list, in order to obtain from it more detailed information associated with the screen setting.

In Steps S11 to S14, information on the indicator associated with the screen setting (e.g., units such as meter, feet, etc.) used for display is received from all the indicators on the reception list.

In Step S15, a list of indicators to have their screens set is displayed.

In Step S16, an indicator to have its screen set is newly selected.

In Step S17, the setting mode for the indicator currently being set is changed to the normal mode. This means that the highlighted display in FIG. 2 is unhighlighted.

The setting mode for the newly selected indicator is changed to the setting-in-progress mode (see Step S18). This means that the field for the indicator selected in FIG. 2 is highlighted. The screens for the respective indicators are set by executing Steps S16 to S18 in a loop.

In Step S19, it is determined whether or not the settings are completed with all the indicators and the setting data is prepared to be sent to them.

If there is any indicator remaining unset, it is determined whether or not to return to the selection screen (see Step S20). If it is determined to return to the selection screen, the "Return" button in FIG. 2 is clicked to set the screen for another indicator (steps S16 to S18). If it is not determined to return to the selection screen, the process exits.

In Step S21, if the settings for all the indicators are completed and the setting data is prepared to be sent to the respective indicators (preferably sequentially), the destination address is set at the address of an indicator to which data is sent first.

The screen display data set for the respective indicators is sent to all the indicators sequentially (see Steps S22 to S25), with an acknowledgement of receipt of the setting data received from each indicator.

Although this invention has been disclosed in the context of a certain preferred embodiment and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Further, by listing method steps in a particular order within a claim, no intention is made to limit the scope of the claim to that particular order. Thus, it is intended that the scope of the present invention herein disclosed should not be limited by the particular disclosed embodiments described above, but should be determined only by a fair reading of the claims that follow.

What is claimed is:

1. A method for setting respective screens of a plurality of inboard indicators connected to an inboard network via a communication line, comprising:
   connecting a terminal to the inboard network;
   loading the terminal with data from the plurality of indicators;
   setting the screens of the indicators in the terminal; and
   sending screen setting data from the terminal to the respective indicators via the inboard network after setting the screens of the indicators on the terminal.

2. The method of claim 1, wherein setting an inboard indicator in the terminal includes causing the indicator to blink.

3. The method of claim 1, wherein a screen of the terminal displays the screen of each of the indicators.

4. The method of claim 1, wherein the setting data on the respective indicators is saved in a memory of the terminal.

5. The method of claim 1, wherein setting the screens of the indicators comprises setting a display format of information displayed on the indicators.

6. The method of claim 5, wherein the display format is chosen from the group consisting of graphical and alphanumerical.

7. A method for setting screen displays of a plurality of indicators disposed remotely apart from one another on a watercraft and being disposed as part of an inboard network on the watercraft, each of the indicators communicating with a terminal node of the inboard network, the method comprising the steps of:
   connecting a terminal to the terminal node of the inboard network;
   loading the terminal with data from the plurality of indicators;
   setting the screens of at least two of the indicators in the terminal; and
   sending screen setting data from the terminal to the respective indicators via the communication network after setting the screens of the indicators on the terminal; and
   saving the screen setting data for each indicator within memory associated with the respective indicator.

8. The method of claim 7 additionally comprising the steps of disconnecting the terminal from the terminal node and connecting an engine communication line with the terminal node such that data from an engine of the watercraft is communicated to the indicators via the inboard network.

9. The method of claim 7, wherein the setting screen data for each indicators is saved in a memory of the terminal.

10. The method of claim 7, wherein setting the screen of one of the indicators involves producing a screen on a display of the terminal that corresponds to the screen to be displayed on the corresponding indicator.

11. The method of claim 7, wherein setting the screens of the indicators comprises setting a display format of information displayed on the indicators.

12. The method of claim 11, wherein the display format is chosen from the group consisting of graphical and alphanumerical.

* * * * *

UNITED STATES PATENT AND TRADEMARK OFFICE
CERTIFICATE OF CORRECTION

PATENT NO. : 7,385,490 B2
APPLICATION NO. : 11/211854
DATED : June 10, 2008
INVENTOR(S) : Takashi Okuyama It is certified that error appears in the above-identified patent and that said Letters Patent is hereby corrected as shown below:

At Column 4, line 3, after "list" please insert -- . --.

Signed and Sealed this

Eighteenth Day of November, 2008

JON W. DUDAS
*Director of the United States Patent and Trademark Office*